United States Patent [19]

Baldwin

[11] 4,277,807
[45] Jul. 7, 1981

[54] RECORDING DIGITAL SIGNALS

[75] Inventor: John L. E. Baldwin, Croydon, England

[73] Assignee: Independent Broadcasting Authority, London, England

[21] Appl. No.: 46,267

[22] Filed: Jun. 7, 1979

Related U.S. Application Data

[63] Continuation of Ser. No. 864,002, Dec. 23, 1977.

[51] Int. Cl.³ .................. G11B 5/00; H04N 5/78; G11B 5/09
[52] U.S. Cl. ..................... 360/32; 360/38; 360/48
[58] Field of Search .............. 360/48, 32, 53, 54, 360/38; 340/146.1 BN, 146.1 BE, 146.1 AU

[56] References Cited

U.S. PATENT DOCUMENTS

| | | | |
|---|---|---|---|
| 3,786,201 | 1/1974 | Myers et al. | 360/32 |
| 4,041,453 | 8/1977 | Umeda et al. | 360/38 |
| 4,054,903 | 10/1977 | Ninomiya | 360/38 |
| 4,081,826 | 3/1978 | Ninomiya | 360/38 |
| 4,143,406 | 3/1979 | Tsuiki et al. | 360/48 |
| 4,146,099 | 3/1979 | Matsushimz et al. | 360/38 |

Primary Examiner—Vincent P. Canney
Attorney, Agent, or Firm—Laubscher & Laubscher

[57] ABSTRACT

A method of recording digital video signals, particularly color television signals, in such a manner that type drop outs and other errors can be corrected, comprises arranging the words in a manner on a recording medium such that the information used to replace an error comes from a part of the recording medium which is statistically well separated from the error. This is achieved using a plurality of recording tracks. Apparatus for carrying out the method comprises a plurality of shift registers for storing the digital signals, and means for reading out the signals in the desired manner. The preferred method of error correction is to arrange signals from the same line of video raster.

18 Claims, 8 Drawing Figures

| No | PCM 12345678 | Code 123P45678 | No | PCM 12345678 | Code 123P45678 |
|---|---|---|---|---|---|
| 0 | 00000000 | 100000000 | 45 | 00101101 | 001000101 |
| 1 | 00000001 | 010000000 | 46 | 1110 | 001000110 |
| 2 | 00000010 | 001000000 | 47 | 1111 | 001001001 |
| 3 | 00000011 | 000100000 | 48 | 00110000 | 001001010 |
| 4 | 00000100 | 011100000 | 49 | 0001 | 001001100 |
| 5 | 00000101 | 101100000 | 50 | 0010 | 001010001 |
| 6 | 00000110 | 110100000 | 51 | 0011 | 001010010 |
| 7 | 00000111 | 111000000 | 52 | 0100 | 001010100 |
| 8 | 00001000 | 100000011 | 53 | 0101 | 001011000 |
| 9 | 00001001 | 100000001 | 54 | 0110 | 010000011 |
| 10 | 00001010 | 100000010 | 55 | 0111 | 010000101 |
| 11 | 00001011 | 010000001 | 56 | 1000 | 010000110 |
| 12 | 00001100 | 111000001 | 57 | 1001 | 010001001 |
| 13 | 00001101 | 011110000 | 58 | 1010 | 010001010 |
| 14 | 00001110 | 101110000 | 59 | 1011 | 010001100 |
| 15 | 00001111 | 110110000 | 60 | 1100 | 010010001 |
| 16 | 00010000 | 111010000 | 61 | 1101 | 010010010 |
| 17 | 0001 | 000110000 | 62 | 1110 | 010010100 |
| 18 | 0010 | 100010000 | 63 | 1111 | 010011000 |
| 19 | 0011 | 010010000 | 64 | 01000000 | 100000101 |
| 20 | 0100 | 001010000 | 65 | 0001 | 100000110 |
| 21 | 0101 | 000100001 | 66 | 0010 | 100001001 |
| 22 | 0110 | 000100010 | 67 | 0011 | 100001010 |
| 23 | 0111 | 000100100 | 68 | 0100 | 100001100 |
| 24 | 1000 | 000101000 | 69 | 0101 | 100010001 |
| 25 | 1001 | 001000001 | 70 | 0110 | 100010010 |
| 26 | 1010 | 001000010 | 71 | 0111 | 100010100 |
| 27 | 1011 | 001000100 | 72 | 1000 | 100011000 |
| 28 | 1100 | 001001000 | 73 | 1001 | 000100111 |
| 29 | 1101 | 010000010 | 74 | 1010 | 000101011 |
| 30 | 1110 | 010000100 | 75 | 1011 | 000101101 |
| 31 | 1111 | 010001000 | 76 | 1100 | 000101110 |
| 32 | 00100000 | 100000100 | 77 | 1101 | 000110011 |
| 33 | 0001 | 100001000 | 78 | 1110 | 000110101 |
| 34 | 0010 | 000100011 | 79 | 1111 | 000110110 |
| 35 | 0011 | 000100101 | 80 | 01010000 | 000111001 |
| 36 | 0100 | 000100110 | 81 | 0001 | 000111010 |
| 37 | 0101 | 000101001 | 82 | 0010 | 000111100 |
| 38 | 0110 | 000101010 | 83 | 0011 | 001000111 |
| 39 | 0111 | 000101100 | 84 | 0100 | 001001011 |
| 40 | 1000 | 000110001 | 85 | 0101 | 001001101 |
| 41 | 1001 | 000110010 | 86 | 0110 | 001001110 |
| 42 | 1010 | 000110100 | 87 | 0111 | 001010011 |
| 43 | 1011 | 000111000 | 88 | 1000 | 001010101 |
| 44 | 1100 | 001000011 | 89 | 1001 | 001010110 |

FIG. 5A

| No | PCM 12345678 | Code 123P45678 | No | PCM 12345678 | Code 123P45678 |
|---|---|---|---|---|---|
| 90 | 01011010 | 001011001 | 135 | 10000111 | 001010111 |
| 91 | 1011 | 001011010 | 136 | 1000 | 000111101 |
| 92 | 1100 | 001011100 | 137 | 1001 | 000111011 |
| 93 | 1101 | 010000111 | 138 | 1010 | 000110111 |
| 94 | 1110 | 010001011 | 139 | 1011 | 100010111 |
| 95 | 1111 | 010001101 | 140 | 1100 | 100011011 |
| 96 | 01100000 | 010001110 | 141 | 1101 | 100011101 |
| 97 | 0001 | 010010011 | 142 | 1110 | 100011110 |
| 98 | 0010 | 010010101 | 143 | 1111 | 011100011 |
| 99 | 0011 | 010010110 | 144 | 10010000 | 011100101 |
| 100 | 0100 | 010011001 | 145 | 0001 | 011100110 |
| 101 | 0101 | 010011010 | 146 | 0010 | 011101001 |
| 102 | 0110 | 010011100 | 147 | 0011 | 011101010 |
| 103 | 0111 | 100000111 | 148 | 0100 | 011101100 |
| 104 | 1000 | 100001011 | 149 | 0101 | 011110001 |
| 105 | 1001 | 100001101 | 150 | 0110 | 011110010 |
| 106 | 1010 | 100001110 | 151 | 0111 | 011110100 |
| 107 | 1011 | 100010011 | 152 | 1000 | 011111000 |
| 108 | 1100 | 100010101 | 153 | 1001 | 101100011 |
| 109 | 1101 | 100010110 | 154 | 1010 | 101100101 |
| 110 | 1110 | 100011001 | 155 | 1011 | 101100110 |
| 111 | 1111 | 100011010 | 156 | 1100 | 101101001 |
| 112 | 01110000 | 100011100 | 157 | 1101 | 101101010 |
| 113 | 0001 | 011100001 | 158 | 1110 | 101101100 |
| 114 | 0010 | 011100010 | 159 | 1111 | 101110001 |
| 115 | 0011 | 011100100 | 160 | 10100000 | 101110010 |
| 116 | 0100 | 011101000 | 161 | 0001 | 101110100 |
| 117 | 0101 | 111001000 | 162 | 0010 | 101111000 |
| 118 | 0110 | 111000100 | 163 | 0011 | 110100011 |
| 119 | 0111 | 111000010 | 164 | 0100 | 110100101 |
| 120 | 1000 | 110101000 | 165 | 0101 | 110100110 |
| 121 | 1001 | 110100100 | 166 | 0110 | 110101001 |
| 122 | 1010 | 110100010 | 167 | 0111 | 110101010 |
| 123 | 1011 | 110100001 | 168 | 1000 | 110101100 |
| 124 | 1100 | 101101000 | 169 | 1001 | 110110001 |
| 125 | 1101 | 101100100 | 170 | 1010 | 110110010 |
| 126 | 1110 | 101100010 | 171 | 1011 | 110110100 |
| 127 | 1111 | 101100001 | 172 | 1100 | 110111000 |
| 128 | 10000000 | 010011110 | 173 | 1101 | 111000011 |
| 129 | 0001 | 010011101 | 174 | 1110 | 111000101 |
| 130 | 0010 | 010011011 | 175 | 1111 | 111000110 |
| 131 | 0011 | 010010111 | 176 | 10110000 | 111001001 |
| 132 | 0100 | 001011110 | 177 | 0001 | 111001010 |
| 133 | 0101 | 001011101 | 178 | 0010 | 111001100 |
| 134 | 0110 | 001011011 | 179 | 0011 | 111010001 |

FIG. 5B

| No | PCM 12345678 | Code 123P45678 | No | PCM 12345678 | Code 123P45678 |
|---|---|---|---|---|---|
| 180 | 10110100 | 111010010 | 224 | 11100000 | 101110111 |
| 181 | 0101 | 111010100 | 225 | 0001 | 101111011 |
| 182 | 0110 | 111011000 | 226 | 0010 | 101111101 |
| 183 | 0111 | 011100111 | 227 | 0011 | 110110111 |
| 184 | 1000 | 011101011 | 228 | 0100 | 110111011 |
| 185 | 1001 | 011101101 | 229 | 0101 | 110111101 |
| 186 | 1010 | 011101110 | 230 | 0110 | 110111110 |
| 187 | 1011 | 011110011 | 231 | 0111 | 111010111 |
| 188 | 1100 | 011110101 | 232 | 1000 | 111011011 |
| 189 | 1101 | 011110110 | 233 | 1001 | 111011101 |
| 190 | 1110 | 011111001 | 234 | 1010 | 111011110 |
| 191 | 1111 | 011111010 | 235 | 1011 | 110101111 |
| 192 | 11000000 | 101100111 | 236 | 1100 | 101101111 |
| 193 | 0001 | 101101011 | 237 | 1101 | 011101111 |
| 194 | 0010 | 101101101 | 238 | 1110 | 111001111 |
| 195 | 0011 | 101101110 | 239 | 1111 | 000101111 |
| 196 | 0100 | 101110011 | 240 | 11110000 | 001001111 |
| 197 | 0101 | 101110101 | 241 | 11110001 | 010001111 |
| 198 | 0110 | 101110110 | 242 | 11110010 | 100001111 |
| 199 | 0111 | 101111001 | 243 | 11110011 | 000111110 |
| 200 | 1000 | 101111010 | 244 | 11110100 | 101111110 |
| 201 | 1001 | 101111100 | 245 | 11110101 | 011111101 |
| 202 | 1010 | 110100111 | 246 | 11110110 | 011111110 |
| 203 | 1011 | 110101011 | 247 | 11110111 | 011111100 |
| 204 | 1100 | 110101101 | 248 | 11111000 | 000111111 |
| 205 | 1101 | 110101110 | 249 | 11111001 | 001011111 |
| 206 | 1110 | 110110011 | 250 | 11111010 | 010011111 |
| 207 | 1111 | 110110101 | 251 | 11111011 | 100011111 |
| 208 | 11010010 | 110110110 | 252 | 11111100 | 111011111 |
| 209 | 0001 | 110111001 | 253 | 11111101 | 110111111 |
| 210 | 0010 | 110111010 | 254 | 11111110 | 101111111 |
| 211 | 0011 | 110111100 | 255 | 11111111 | 011111111 |
| 212 | 0100 | 111000111 | | | |
| 213 | 0101 | 111001011 | | | |
| 214 | 0110 | 111001101 | | | |
| 215 | 0111 | 111001110 | | | |
| 216 | 1000 | 111010011 | | | |
| 217 | 1001 | 111010101 | | | |
| 218 | 1010 | 111010110 | | | |
| 219 | 1011 | 111011001 | | | |
| 220 | 1100 | 111011010 | | | |
| 221 | 1101 | 111011100 | | | |
| 222 | 1110 | 011110111 | | | |
| 223 | 1111 | 011111011 | | | |

FIG. 5C

RECORDING DIGITAL SIGNALS

This is a continuation of application Ser. No. 864,002, filed Dec. 23, 1977.

REFERENCE TO RELATED APPLICATIONS

The subject matter of this invention relates to subject matter similar to that contained in co-pending U.S. applications Ser. Nos. 864,006 of Dec. 23, 1977 (having a British priority date of Dec. 23, 1977) and 923,973 of July 12, 1978 (having a British priority date of July 14, 1977), each assigned to the same assignee as the present invention.

BRIEF DESCRIPTION OF THE PRIOR ART

The present invention relates to recording or transmitting digital signals, and in particular to a method of and apparatus for recording or transmitting digital signals in such a manner that errors in the signals can be concealed.

When the signals are recorded on magnetic tape, errors such as tape "drop-outs" can occur. Drop-outs usually arise due to a speck of dust or a blemish on the tape causing the recording or play back head to separate from the tape. Due to the relative head-to-tape speeds, which are of the order of 1500 inches per second, the frequency of occurrence of drop-outs, of average duration 3 microseconds, would be 10 to 100 per minute. Errors can also occur due to spurious signals when information carrying signals are transmitted.

SUMMARY OF THE INVENTION

The present invention provides a method of transmitting or recording digital signals, comprising the steps of sampling an analogue signal, converting said samples into digital words, and transmitting or recording the words such that adjacent words are statistically well separated (as hereinafter defined).

BRIEF DESCRIPTION OF THE DRAWINGS

Features and advantages of the present invention will become apparent from the following description of an embodiment thereof given by way of example with reference to the accompanying drawings, in which:

FIGS. 4 and 5A–5C—which correspond to the figures of Application Ser. No. 864,006 filed Dec. 23, 1977, abandoned in favor of continuation-in-part Application Ser. No. 117,511 filed Feb. 1, 1980—are, respectively, a block diagram of apparatus for producing digital signals, and a suitable code for use with the apparatus of FIG. 4.

DETAILED DESCRIPTION

A preferred embodiment of the present invention, will now be described in relation to its use as a television video signal recorder using magnetic tape.

The digital signals are recorded in the form of words which consist of a plurality of bits, preferably 8 bits. The words are reconstituted on play back and are checked for errors. If an error occurs, the word in question is rejected and replacement word inserted in its place. The words are recorded in such a manner that the information used to generate a replacement word comes from parts of the tape sufficiently remote so that there is negligible correlation between the incidence of drop-outs on the parts of the tape considered. This is what is meant by the term statistically "well separated" which is used in the following description. For example at least two tracks may be used simultaneously to record the words, whole words being recorded on each track. Alternatively, one track may be used together with addition buffer storage to simulate the effect of two or more tracks by using two or more channels as is disclosed in our co-pending Application U.S. Ser. No. 923,973 filed July 12, 1978, now abandoned in favor of continuation-in-part Application Ser. No. 128,861 filed Mar. 10, 1980. The present arrangement concentrates the errors into relatively few words by ensuring that whole words in serial form are recorded on each track and, in addition, if an error occurs, the information used to generate a replacement word comes from another track or tracks, or from a part of the same track statistically well separated from the original word. The preferred method of generating a replacement word is to average words of the same phase on either side of the word in which there is an error.

The above relates solely to recording signals but it is apparent that the techniques could be applied to the transmission of digital signals.

Figure 1:
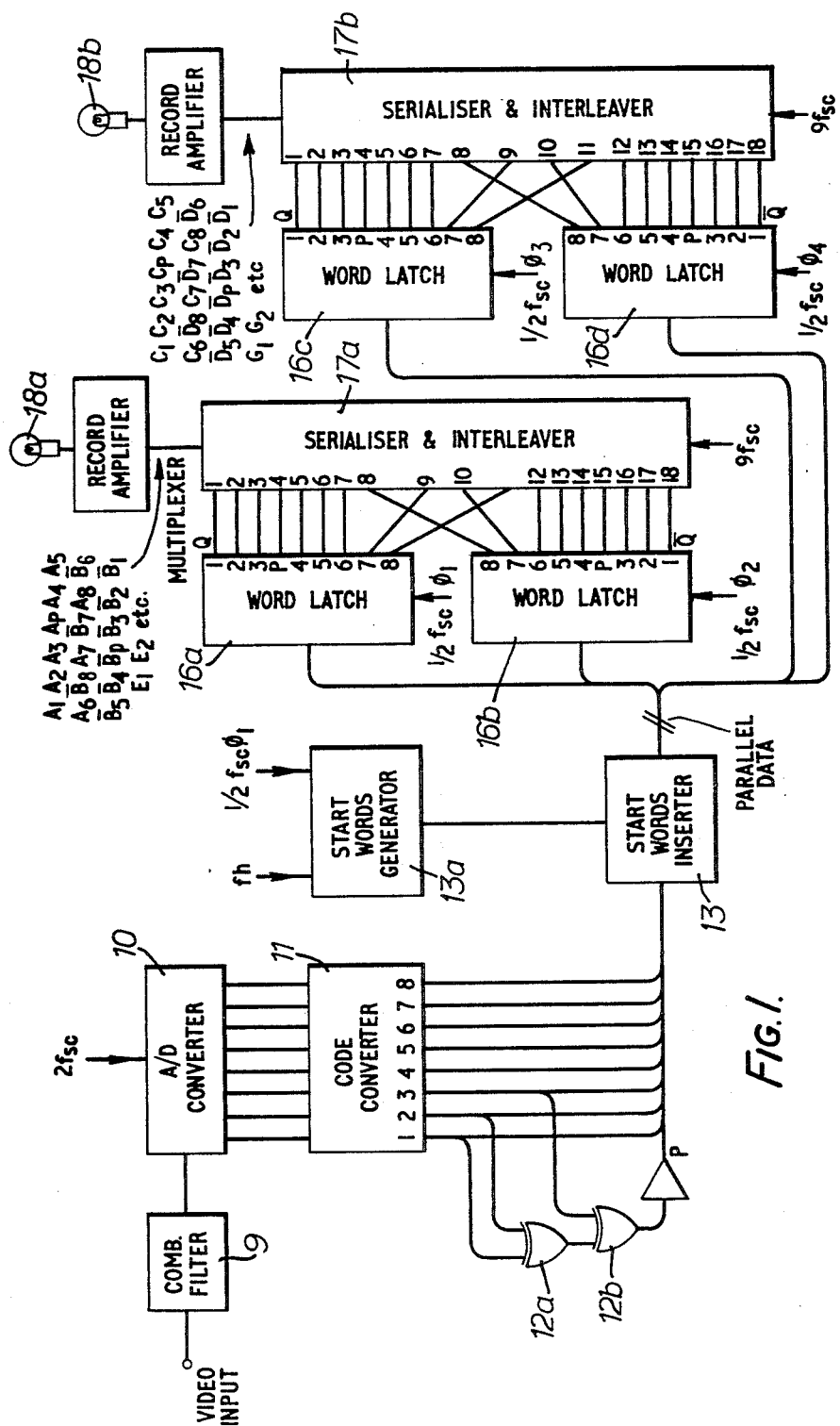
FIG. 1 shows in block diagram form apparatus for recording digital signals.

Referring now to FIG. 1, there is shown an arrangement for recording words on two tracks on a magnetic tape. It is assumed that the sampling rate will be twice the subcarrier frequency of the television video signal although the rate could be three times the subcarrier frequency. FIG. 1 shows, in addition to an embodiment of the present invention, an embodiment of a further invention which is the subject of our co-pending Application Ser. No. 864,006 filed Dec. 23, 1977, now abandoned in favor of continuation-in-part Application Ser. No. 117,511 filed Feb. 1, 1980, of the words to improve the clock pulse recovery may be improved. However, only those parts of FIG. 1 relevant to the present application will be described attention being directed to FIGS. 4 and 5 for details of coding, parity bit insertion and interleaving of the words. The apparatus of FIGS. 4 and 5 will be described in relation to its use for television video signals, but it will be appreciated that the apparatus is of general use, for example, for sound. When a video signal is converted to digital form the technique used herein is to sample the signal at equal time intervals and to convert each sample produced into a binary number, which will be assumed to have eight digits, the binary integer 'n' chosen can be considered to be that which makes a voltage nq most closely correspond to the sample; q, a quantum, is the difference between one representable level and the next. For most purposes q would be a constant, but in some applications for example before gamma correction, it may be more advantageous for q to be a variable.

An eight digit binary number can represent the decimal numbers 0 to 255, 0 corresponding to 0000 0000 and 255 to 1111 1111. If a zero corresponds to zero volts and a '1' corresponds to one volt then for a Non-Return to zero (NRZ) code the DC component of the digital signal can vary from 0 to 1 volt.

A further problem can arise if repetition of numbers such as 0000 0000 occurs. In this case there would be no transitions and circuits relying on recovered clock signals could get out of step.

The method and apparatus used in the preferred embodiment are designed on the basis that there is a significant correlation between closely spaced points of a television picture defined by samples. As will be described in more detail later, the apparatus transmits two words in series along a path, one of the words being the ones complement to that word. Preferably, at least some of the bits of one word are interleaved with some of the bits of the ones complement of the other word, the words relating to a spatially near point of the picture. It is assumed that there is a significant positive correlation between the uncomplemented data, and a suitable binary code chosen accordingly.

The principle is to transmit along a path one word representing one point but to transmit adjacent to it and preferably to intersperse between its digit the ones complement of another word relating say to a spatially near point of the picture; the essential requirement being an expected significant positive correlation between the uncomplemented data. This would also permit the use of a signal one field later for example.

Normally the two words would be numerically close to one another but this does not ensure a sufficient number of transitions. To illustrate this point consider the two words representing 127 and 128; in normal binary form these are represented as 0111 1111 and 1000 0000. The second word when complemented becomes 0111 1111 so the two words when completely interdigitated are:

00 11 11 11 11 11 11 11 which only contains one transition.

This problem may be decreased by converting the words to a suitable code before complementing the bits of one of them, and remaining in this code until the critical parts of the equipment has been passed. The problem could only be serious with words approximately ⅜ or ⅝ of the total range apart and even then it would additionally require the DC component of one of the words to be low.

Often parity is used for error detection and concealment. Preferably this should be 'odd' parity of an odd number of bits. This is performed by module 2 adding say 3 or 5 bits together and if the sum is 0 the parity is '1' and vice versa. When such a parity bit is inserted in each word this increases the minimum number of transitions.

Figure 4:
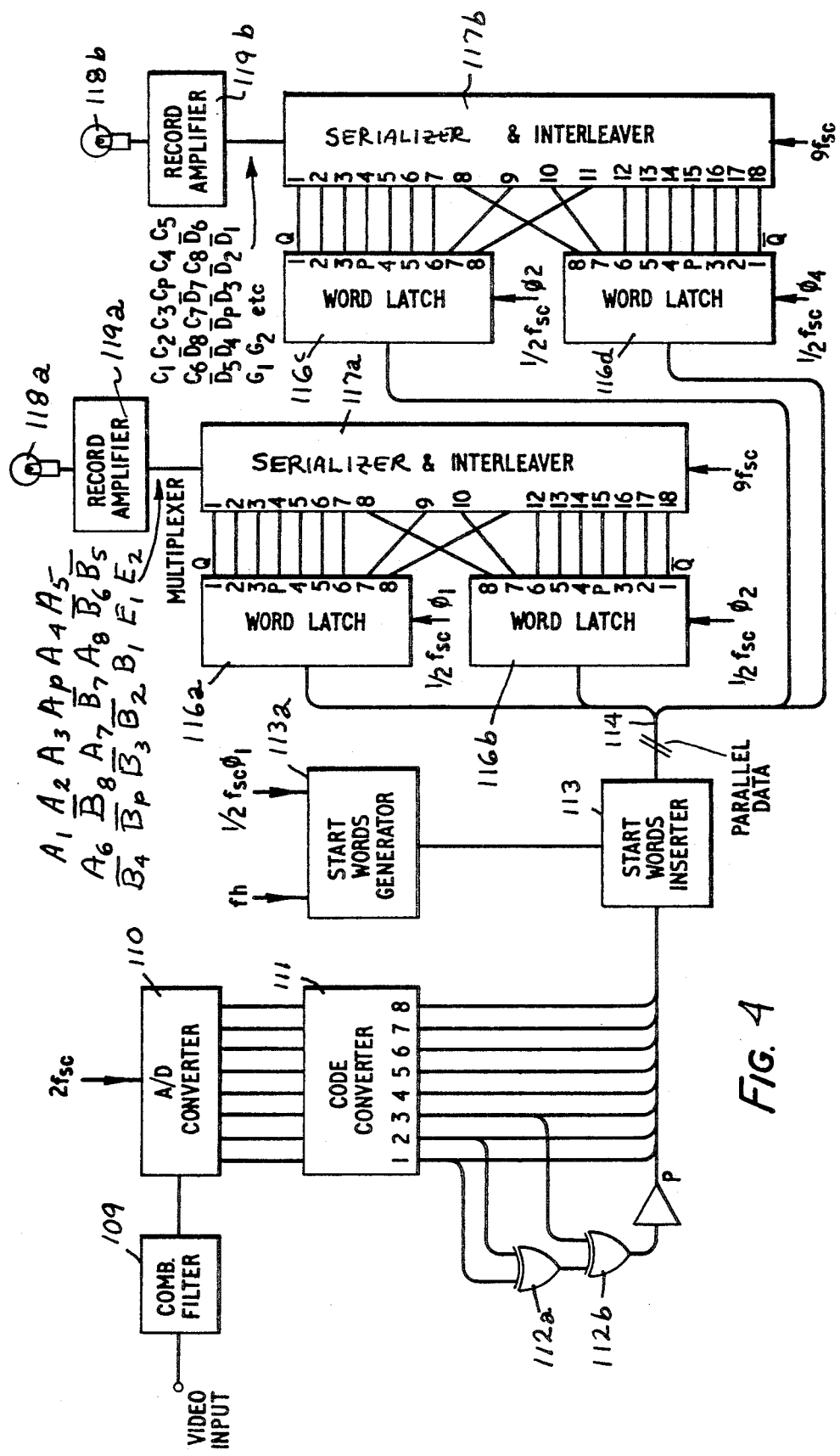

Referring now to FIG. 4, a video input is fed through a comb filter 109 to an analogue to digital converter 110 which converts the video signal into a plurality of digital words by sampling the signal at a frequency which is a multiple of the frequency of the video subcarrier, in this case at twice the video subcarrier frequency. Each word is then fed to a code converter 111 which converts the binary words to a suitable code, for example the code shown in FIG. 2. This is preferably achieved using a read only memory. After code conversion, a parity bit is inserted in each word by modulo 2 adding the first three bits of the word using the EXCLUSIVE OR gates 112a, 112b. The words are then fed in series through a start words inserter circuit 113 to four word latches 116a to 116d. The start words inserter circuit 113 is fed from a start words generator circuit 113a operating at line frequency which produces a digital word to identify the start of a new line of video signals. The start words are used to synchronize operation of the playback apparatus (not shown). The word latches are arranged in pairs, one of each pair passing the word exactly as it enters the latch, and the other producing the ones complement of the word entering the latch.

The operation of the part of the circuit including the latches 116a and 116b will now be described, it being understood that the other part of the circuit is identical but used alternatively. When the first word is fed through the start words inserter 113 it is fed on to output lines 114 which are connected to all the word latches. Therefore depending on which latch is being clocked, the word will enter one of the latches.

Assume that the first word is clocked into latch 116a and the second word is clocked into latch 116b. The output from the latch 116a is identical to the word fed into that latch while the output from the latch 116b is the ones complement of the word fed to that latch. The outputs from the latches 116a, 116b are then fed to a serializing and interleaving circuit 117a where the first word and the ones complement of the second word are interleaved. The degree of interleaving is determined before hand and in this case only the seventh and eighth bits of each word are interleaved as shown in the drawing. This has been found to give satisfactory results.

The degree of interleaving between the words can be altered, but this is determined by the code used. For example, the above code is intended to be fully interleaved, in fact it was chosen so that only the seventh and eighth bits of the words would be interleaved. The interleaved words are then fed to a recording head 118a via a record amplifier 119a for recording the digital signals on a recording medium, preferably magnetic tape.

Referring now to FIGS. 5A–5C, in more detail, this shows two columns for each number, the first being the number written as a binary number and the second being the code assigned to that binary number including the parity bit. From examination of the second column, it will be seen that for numbers between 21 and 234 inclusive, the maximum run length does not exceed three at the ends of the words and five within the words. This is acceptable only because it can be shown statistically that most words will fall between numbers 21 and 234.

Using the code shown in FIGS. 5A–5C, the d.c. component is substantially reduced and so the clock signals can be recovered on playback.

The code can be used for colour video signals and although shown in a recording use, can also be used for the transmission of digital video signals.

Referring again to FIG. 4, it will be seen that the digital signals are processed in two channels and that two recording heads 118a, 118b are used one for each channel. This arrangement could be altered by feeding the outputs from both channels sequentially to a single recording head. A video input is fed through a comb filter 9 and is converted to a plurality of digital words filter constituted by a plurality of bits by means of an A/D converter 10 sampling the video signal at twice the frequency of the video subcarrier (i.e., $2f_{sc}$). Each of the words is then fed via a code converter circuit 11 and start words inserter 13 to each of four word latches 16a to 16d simultaneously. The OR-gates 12a and 12b add the first three bits of the word, as shown, whereby a parity bit signal P is inserted in the word. However, each of the word latches is clocked at a different time ($\phi_1$, $\phi_2$, $\phi_3$, $\phi_4$) to the others and so the word fed to the latches 16 is only clocked into one of them at any one time. Thus the words are separated for recombination in the desired manner which in the present case is groups of words with the number of words in a group being equal to the number of samples in a cycle of subcarrier. The start words inserter 13—which is a data selector similar to the data selector 45f shown in FIG. 3—is supplied with a signal from start words generator 13a operable at line frequency $f_h$ in accordance with subcarrier signal $\frac{1}{2} f_{sc}\phi_1$, and produces a digital word to identify the start of a new line of video signals, as discussed above with respect to FIG. 4. As indicated in FIG. 1, start words generator 13a, a shift register or memory device for storing a start word or start words, supplies a word or words being read out of the shift register at a time determined by the frequency of the signal $f_h$.

The word latches 16 are arranged in two channels each having two latches and the clocking arrangement ($\phi_1$, $\phi_2$, $\phi_3$, $\phi_4$) is such that the first word is stored in the uppermost latch 16a in FIG. 1; the second word is stored in the next latch 16b; the third word is stored in the next latch 16c, etc.

The two uppermost latches are connected to a serializing and interleaving circuit 17a which puts the second word back into series with the first in a particular manner described in our co-pending application Ser. No. 864,006 mentioned above and feeds the resultant signal to a recording head 18a. Thus, as shown in the drawing, the seventh and eighth bits are interleaved (as predetermined beforehand by the selected wiring connections), whereby the first word and the ones complement of the second word are interleaved. The serializer and interleaver devices are conventional parallel to series converters. A similar procedure takes place with the two lower latches 16c and 16d. This allows the clock to be reconstituted from the data words.

Thus, in accordance with a characterizing feature of the invention, the first, second, fifth, sixth, ninth, tenth, etc. words are recorded using the word latches 16a, 16b and recording head 18a on to one track of a magnetic recording tape while the third, fourth, seventh, eighth, eleventh, twelfth, etc. words are recorded using the word latches 16c, 16d and recording head 18b on to another track of the same recording tape. Since a sampling rate of twice the subcarrier frequency is used, the first, third, fifth, etc. words are of the same phase of subcarrier. Likewise the second, fourth, sixth, etc. words are all of the same phase of subcarrier but of different phase to that of the first, third, etc. words.

Playback of a signal recorded in the above manner will now be described with reference to FIGS. 2 and 3.

Figure 2A:
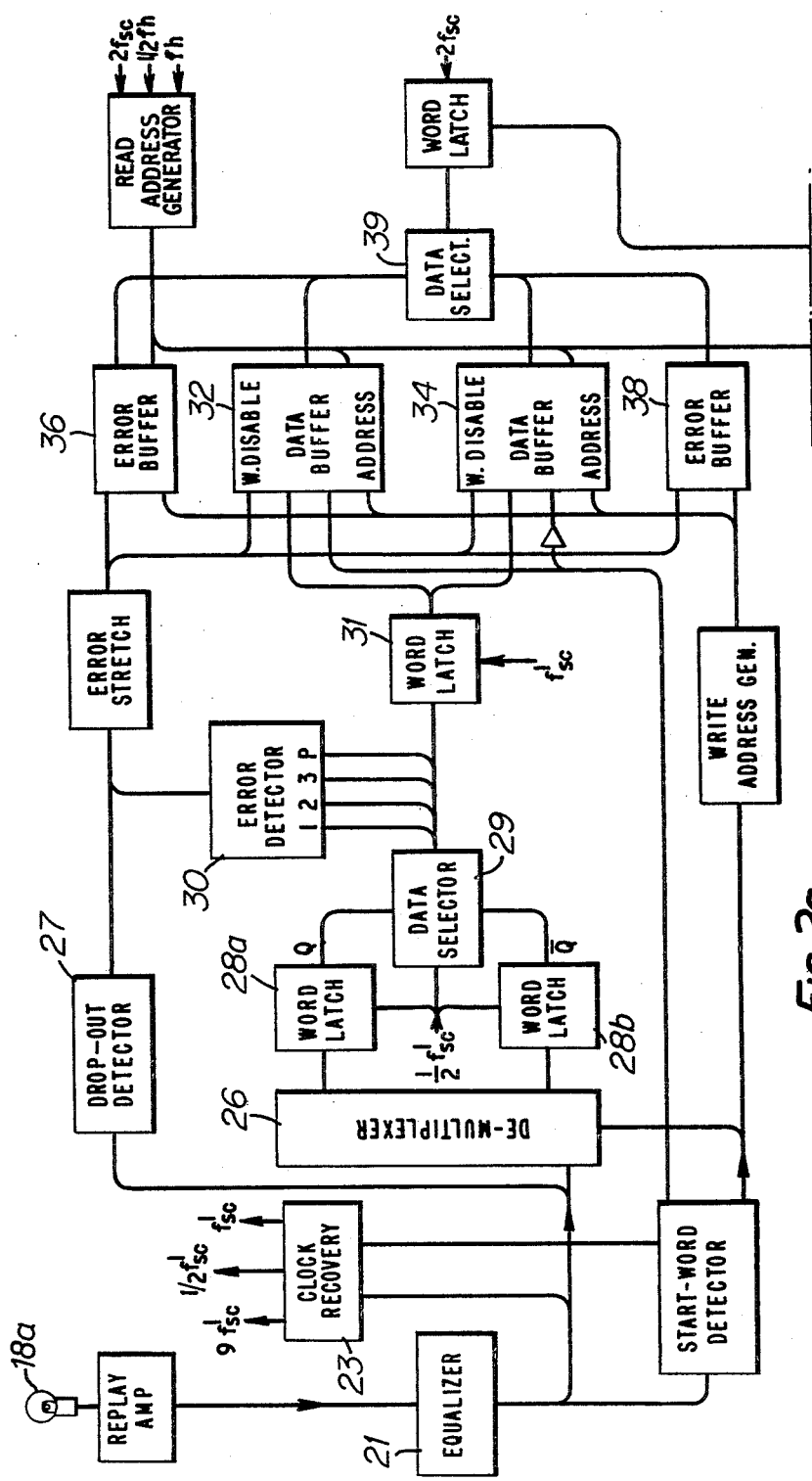
FIGS. 2a and 2b are block diagrams of playback apparatus for recovering an analogue signal from a digital signal recorded using the apparatus of FIG. 1.
Figure 2B:
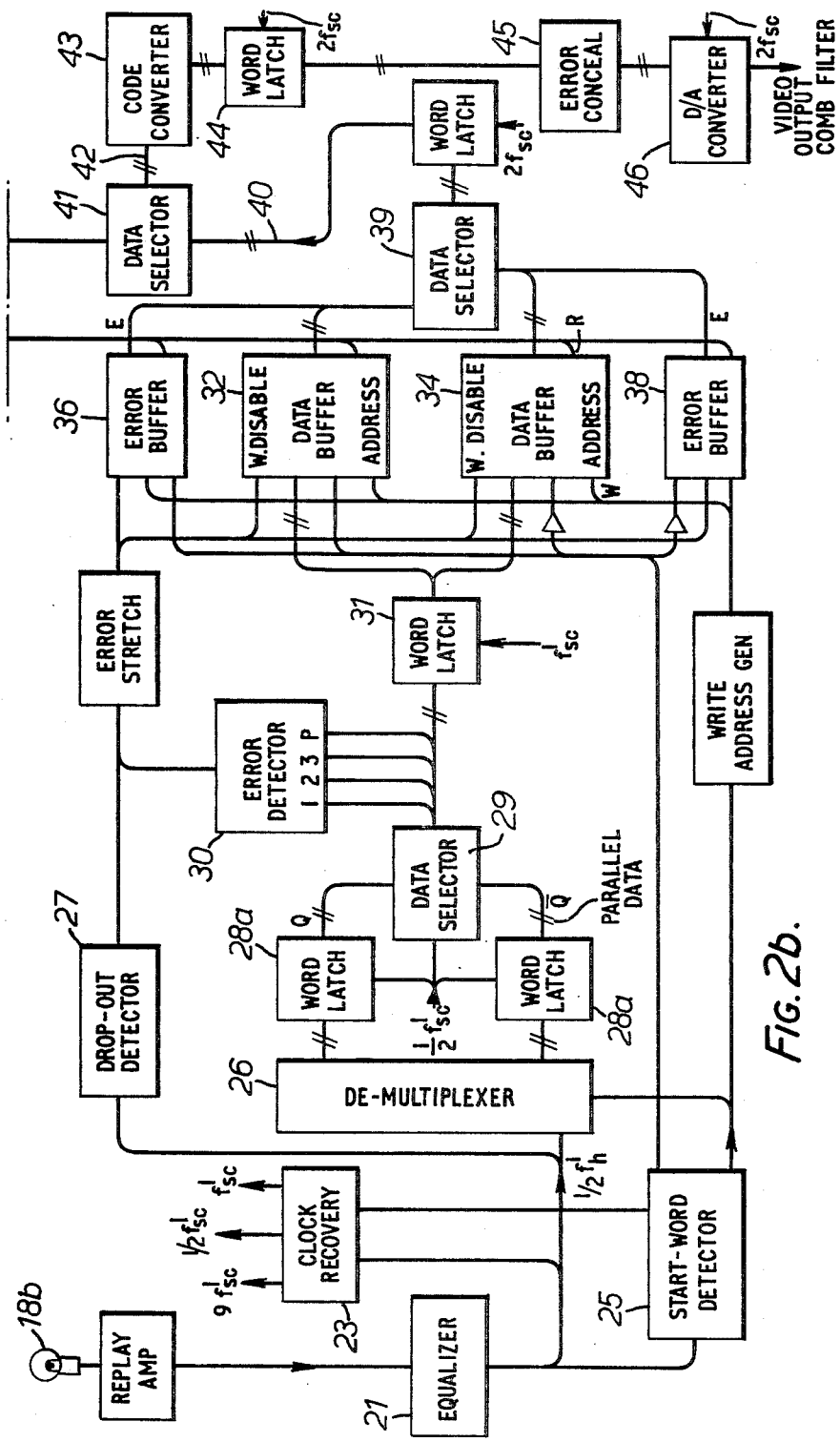

FIGS. 2a and 2b are block diagrams of play back apparatus and comprises two identical channels, one for each playback head, respectively. One channel deals with one track of the tape while the other channel deals with the other track.

The operation of one channel will now be described briefly and it is to be understood that the operation of the other channel is identical.

Looking at the lower portion of FIG. 2b, the tape, head 18b produces signals from one track of the magnetic tape and these signals are fed to an equalizer circuit 21. From there the signals are fed to a clock recovery circuit 23, a start word detector 25 and a drop-out detector 27.

In accordance with the present invention, assuming that the third and fourth words are picked up by the head 18b (the first and second words having been picked up by the head 18a) they are fed through the start-word detector 25 to circuits for separating the third and fourth words (by exactly reversing the serializing and interleaving process). These circuits are constituted by a demultiplexer circuit 26 which feeds two word latches 28a, 28b in parallel. A data selector circuit 29 alternately feeds the words at the output of the latches one after another to a parity detector circuit 30 and also to a further word latch 31. The individual words are checked for parity by the parity detector 30, and, if correct and if no drop-outs have been detected by the drop-out detector 27, the words are stored in a data buffer 32 or 34 which are used on alternate lines of the video scan.

If a drop-out has occurred, or if the parity check indicates an error, an error signal is supplied to the WRITE DISABLE terminal (i.e., "W. DISABLE") of data buffer 32 or 34, and the doubtful word or words are not written into the data buffer thus leaving information for two lines earlier in the buffer. An error signal is stored in the appropriate error buffer 36 or 38. Thus, an error only controls the routing in so far as a signal is applied to the WRITE DISABLE terminals of the data buffers to stop erroneous information from being written into the buffers.

A data selector 39 alternately connects for a line at a time the upper data and error buffers and the lower data and error buffers on to a channel output route 40 where a further data selector 41 (FIG. 2b) alternately connects for two words at a time the two channels to a further output route 42. As shown in the drawing, the data selectors each gate one of two sets of inputs onto an output line. The words are re-converted in a converter 43 and then fed to a digital to analogue converter 46, from which is produced the video signal, through a word latch 44 and error concealment circuit 45 (FIG. 2b) which are shown in more detail in FIG. 3.

Figure 3:
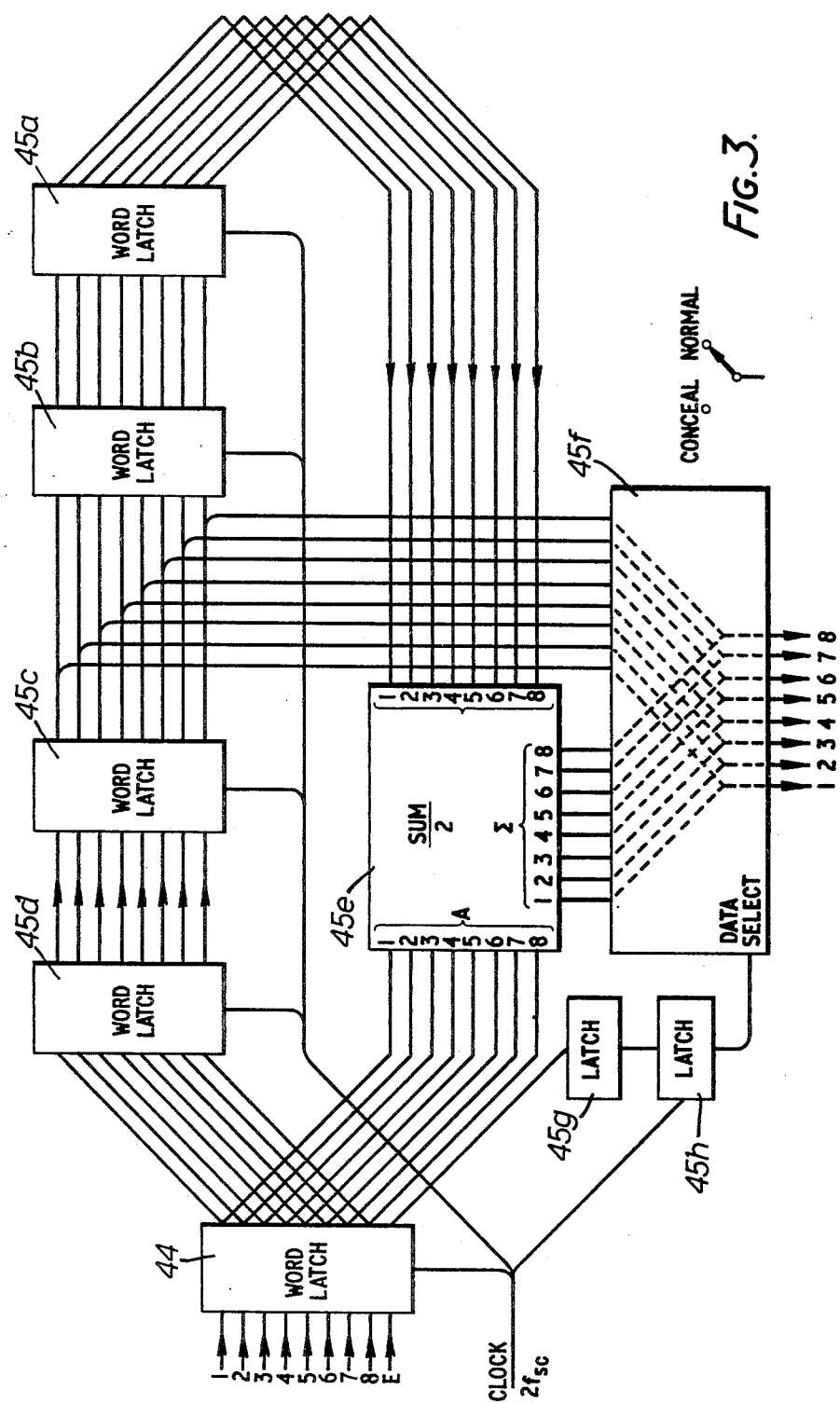
FIG. 3 shows in block diagram, form a portion of the apparatus of FIG. 2.

Referring now to FIG. 3, it will be appreciated that the words fed to the latch 44 are in series, with the first two words coming from one channel the next two words from the other channel, etc. Assume now that the first word is in word latch 45a, the second in latch 45b, etc. the fifth word is this in word latch 44 and is simultaneously fed to one side of an averaging circuit 45e where it is averaged with the first word. The output from the error concealment circuit 45 to the converter 46 (FIG. 2b) is taken from either the output from the word latch 45c, i.e. the third word, or the averaging circuit 45e depending on whether or not the latch 45c contains good information or information from two lines previously if the word which should be there contained an error. It will be remembered that the data buffers 32,34 are disabled in the presence of an error leaving information from two lines before in the buffer.

The concealment circuit 45 recognizes a word or an error by virtue of an output from the word latch 44. An error signal from latch 44 is clocked through two latches and is used to alter the position of a data select circuit 45f so that the output from the latch 45c is not fed to the digital to analogue converter 46 when the word in error would have reached latch 45c, rather the output from the averaging circuit is fed to the converter 46.

For example, assume that the third word has an error. The first and second words are clocked through the latches 45d to 45a normally and fed to the converter 46 when they reach the latch 45c. However, when the third word should have reached latch 44, an error signal is present additionally. At the next clock pulse, the error signal is clocked into latch 45g. The first and second words continue along the line of latches 45d to 45a normally. On the next clock pulse the word from two lines previously clocked into word latch 45c where it should be fed via the data select circuit 45f to the converter 46. However, latch 45h is engaged, which switches over the data selector circuit 45f so that it feeds the converter 46 from the averaging circuit 45e. The averaging circuit 45e produces the average of the first word, which is now in latch 44, and the fifth word. Thus, concealment circuit 45 detects an error because there is no digital word written into the word latch 44. Rather, as shown in FIG. 2b, an error signal E is written into the latch 44 at the time a word in error would have appeared. This error signal E is then latched through the error latches 45g and 45h (as shown in FIG. 3) to produce the corrected output at the correct time.

It will be remembered that the words are in groups of two with the first and second words being in one group being taken from one track of the magnetic recording tape while the third and fourth words are in another group, and are taken from the other track, and so on. Thus, the missing third word which was in one track is replaced by the average of the first and fifth words of the same line which were on the other track.

The above arrangement of replacing information missing from one track by information taken from another track can be altered to cater for two tracks and a sampling frequency of three times the video subcarrier frequency, or for three tracks and a sampling frequency three times the subcarrier frequency. In general, if sampling occurs at 'n' times subcarrier frequency, a system recording 'n' successive words on one track before passing to the next track gives satisfactory error concealment. However, with two tracks and sampling at three times the subcarrier frequency succeeding words can be recorded on alternate tracks.

The replacement words are chosen so that they relate to similar positions on the subcarrier signal as this improves the concealment. Thus, when sampling is at twice the subcarrier frequency, the replacement words are taken from positions two words away on either side of the word in error; and when sampling is at three times the subcarrier frequency, the replacement words are taken from positions three words away on either side of the word in error.

It is also possible to use the immediately adjacent words on either side of the word in error but this requires a different disposition of the words on the tops than is described above. It would be used for the reproduction of digitally coded audio signals or for digitally coded component signals i.e. luminance and/or colour difference signals.

What we claim is:

1. The method for recording an alternating current analog signal in a manner to alleviate drop-outs, said signal having a given subcarrier frequeny ($f_{sc}$), comprising the steps of
    (a) sampling the analog signal at a sampling frequency which is a multiple of the subcarrier frequency ($f_{sc}$), thereby to produce a plurality of digital words constituted by a plurality of bits;
    (b) introducing into said digital words an error detection signal (P);
    (c) storing groups of said digital words in at least two separate channels, respectively, a first group of words of one channel including first and second subgroups of words of different phase relative to each other, and a second group of words of the other channel including third and fourth subgroups of words of different phase relative to each other;
    (d) serializing the subgroups of words of each channel, respectively; and
    (e) recording on a recording medium the serialized channel signals, respectively.

2. A method according to claim 1 wherein the sampling is a 'n' times the subcarrier frequency and wherein the information for replacing the word in error is derived from words of the same line that are 'n' displaced before and after the word in error.

3. A method according to claim 1, and wherein sampling occurs at two times subcarrier frequency.

4. A method according to claim 1, wherein the recording step further comprises processing the words by delaying words in one channel with respect to words representing adjacent samples of the same phase in another channel.

5. A method according to claim 4, wherein the recording step further comprises combining the channels and recording them on a single track on a recording medium.

6. A method according to claim 1, wherein each channel is recorded as a separate track on a recording medium.

7. A method according to claim 6, wherein there are two tracks and wherein sampling occurs at 'n' times subcarrier frequency and 'n' successive words are recorded on a first track before a further 'n' successive words are recorded on the other track.

8. A method according to claim 6, wherein there are two tracks and wherein sampling occurs at three times subcarrier frequency, succeeding words being recorded on alternate tracks.

9. The method as defined in claim 1, wherein the analog signal represents a line of a video raster.

10. A method of correcting errors in digital video signals recorded by the method according to claim 9, and comprising detecting a word in error and replacing that word using information derived from at least one digital word from the same video line and of the same phase of subcarrier as the word in error.

11. A method according to claim 10, wherein when a word in error is detected a corresponding word from a previous line is retained in a memory.

12. A method according to claim 11, wherein the corresponding word from two lines previously is retained.

13. The method as defined in claim 1, and further including the steps of
    (f) detecting the individual words of each channel recorded on said recording medium, respectively;
    (g) separating the words of each channel, respectively;
    (h) examining the error detection signals of the words of each channel to detect an error therein;
    (i) storing in data storage means for each channel the correct words that do not contain an error;
    (j) storing in error storage means for each channel the words that contain errors: and
    (k) generating, in response to the correct words stored in said data storage means, a replacement word for a given word in error.

14. A method according to claim 13, wherein said at least one digital word is from the same line of video.

15. A method according to claim 13, wherein said at least one digital word is from a previous line of video.

16. Apparatus for recording an alternating current analog signal in a manner to alleviate drop-outs, said signal having a given subcarrier frequency ($f_{sc}$), comprising (a) means including an analog to digital converter (10) for sampling the analog signal at a sampling frequency which is a multiple of the subcarrier frequency ($f_{sc}$), and for producing a plurality of digital words constituted by a plurality of bits;

(b) means (11, 12a, 12b) for introducing into said digital words an error detection signal (P);

(c) means (16a, 16b; and 16c, 16d) for storing groups of said digital words in at least two separate channels, respectively, a first group of words of one channel including first and second subgroups of words of different phase relative to each other, and a second group of words of the other channel including third and fourth subgroups of words of different phase relative to each other;

(d) at least two parallel to series converter means (17a, 17b) for serializing the subgroups of words of each channel, respectively; and (e) at least two recording devices (18a, 18b) for recording on a recording medium the serialized channel signals from said parallel to series converter means, respectively.

17. Apparatus as defined in claim 16, and further including (f) means (18a, 18b, 25) for detecting the individual words of each channel recorded on said recording medium, respectively;

(g) means (26) for separating the words of each channel, respectively;

(h) error detector means (30) for each channel for examining the error detection signals of the words to detect an error therein;

(i) data storage means (32, 34) for each channel for storing those words that do not contain an error;

(j) error storage means (36, 38) for each channel for storing the words that contain errors; and (k) error concealing means (45) responsive to the correct words stored in said data storage means for generating a replacement word for a given word in error.

18. Apparatus as defined in claim 17, and further including data selector means (39, 41) for supplying to said error concealing means in series the words contained in said storage means, said error concealing means including an averaging means (45e), and word latch means (45a–45d) for feeding words successively to said averaging means at a frequency which is the same as the sampling frequency of the analog signals.

* * * * *